Figure 1:
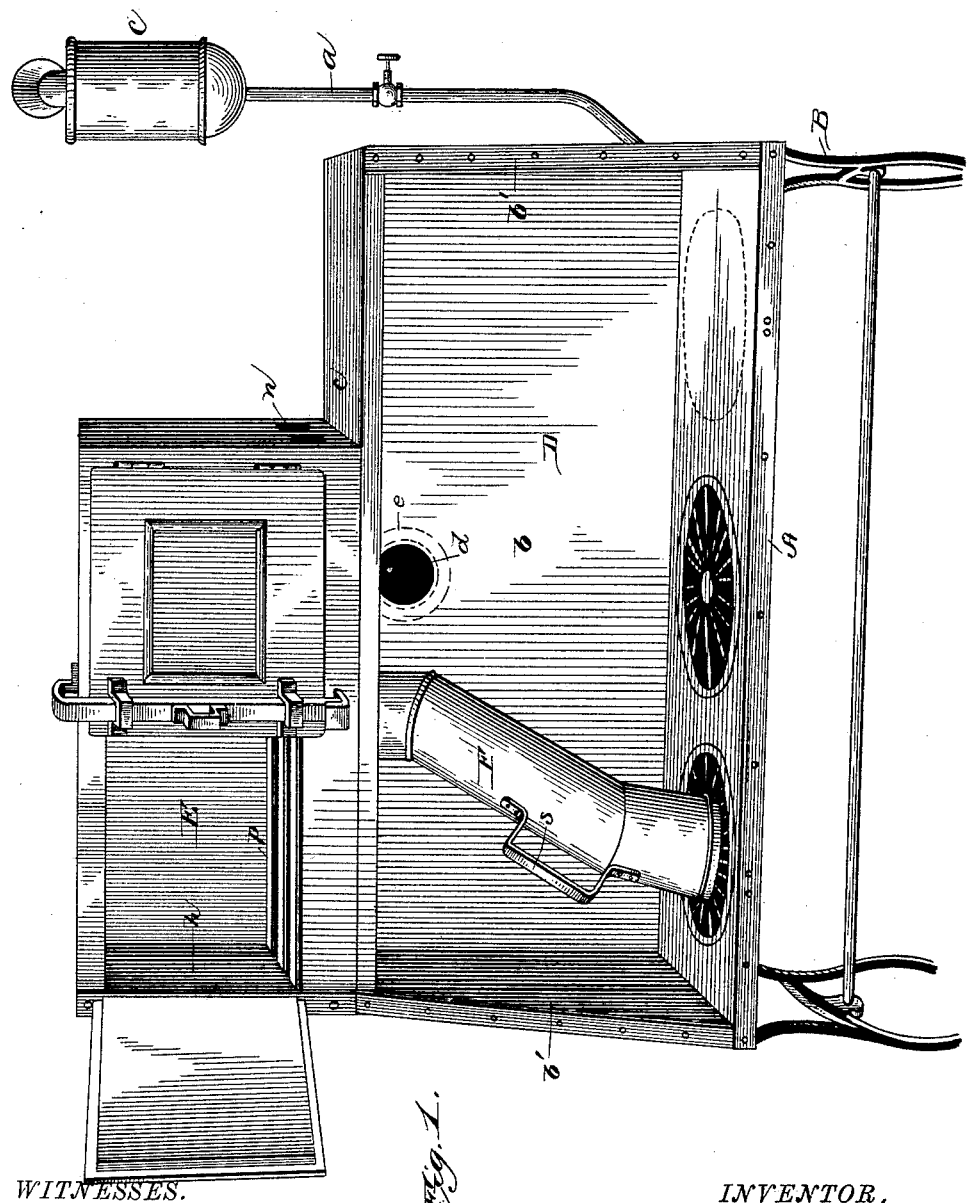

(No Model.) 2 Sheets—Sheet 1.

N. DE F. SISCO.
OVEN FOR GASOLINE OR OTHER VAPOR STOVES.

No. 394,216. Patented Dec. 11, 1888.

WITNESSES.
Edwin L. Yewell
John Enders Jr.

INVENTOR.
Norman D. Sisco
By W. A. Redmond,
Attorney.

(No Model.) 2 Sheets—Sheet 2.
N. DE F. SISCO.
OVEN FOR GASOLINE OR OTHER VAPOR STOVES.
No. 394,216. Patented Dec. 11, 1888.
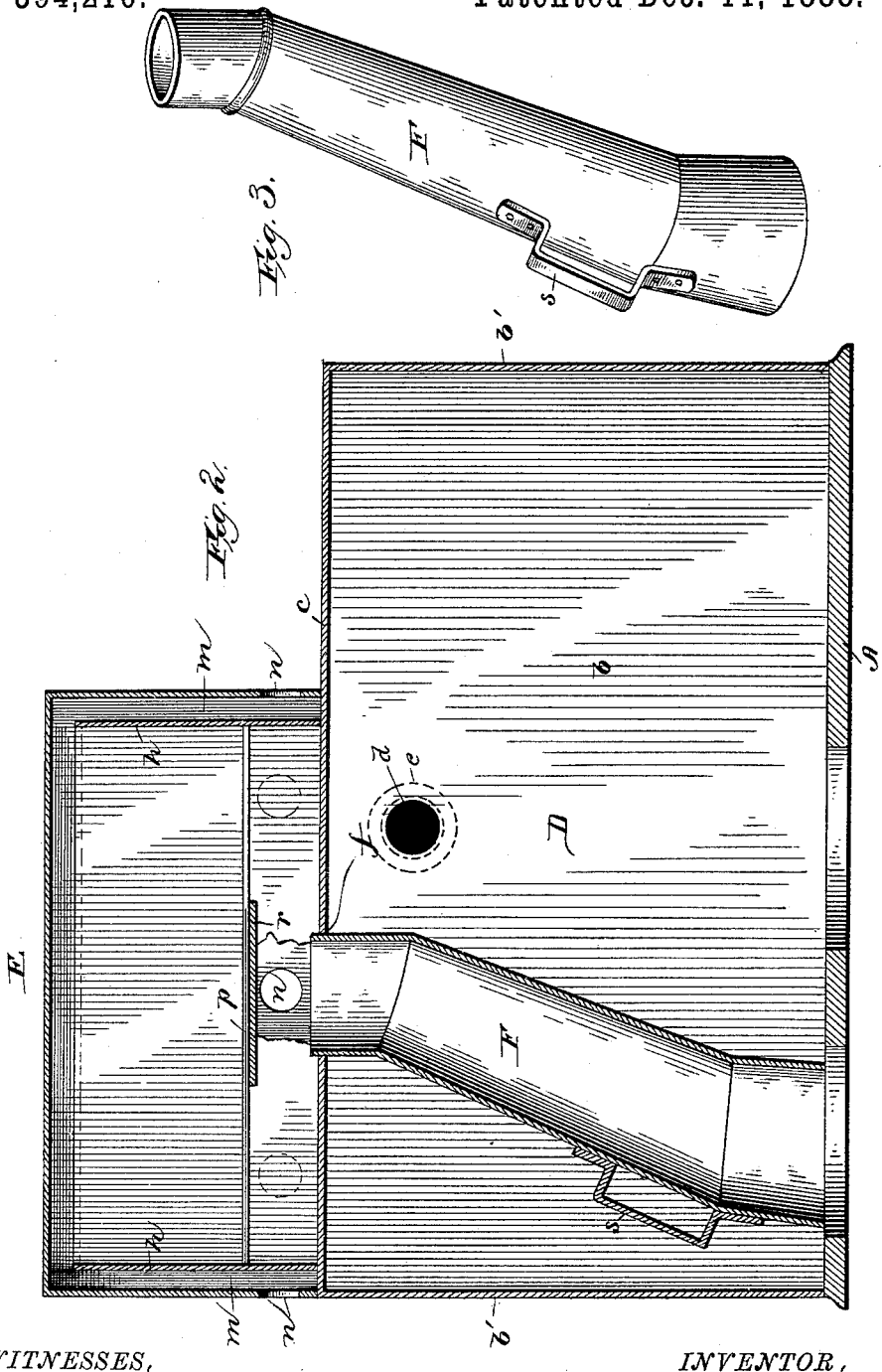
WITNESSES,
Edwin T. Yewell.
John Enders Jr
INVENTOR,
Norman D. Sisco,
By W. A. Redmond.
Attorney.

UNITED STATES PATENT OFFICE.

NORMAN DE FOREST SISCO, OF NORTH TOPEKA, KANSAS.

OVEN FOR GASOLINE OR OTHER VAPOR STOVES.

SPECIFICATION forming part of Letters Patent No. 394,216, dated December 11, 1888.

Application filed February 7, 1888. Serial No. 263,216. (No model.)

*To all whom it may concern:*

Be it known that I, NORMAN DE FOREST SISCO, a citizen of the United States, residing at North Topeka, in the county of Shawnee and State of Kansas, have invented certain new and useful Improvements in Ovens for Gasoline or other Vapor Stoves; and I do hereby declare the following to be a full, clear, and exact description of the invention, such as will enable others skilled in the art to which it appertains to make and use the same.

In the ordinary gasoline-stove the oven, which is usually made separate from the stove, is placed over the burner in near proximity to the same, and only protected from direct contact with the flame, if at all, by a piece of sheet metal within the oven, thus heating the bottom of the oven to such a degree as to form a hard crust on the bottom surface of the article being baked, and oftentimes burning the same before the inside is thoroughly cooked; besides, when the oven is placed on the top of the ordinary size stove, it occupies so much space that hardly anything else can be placed on the same. It has been attempted to obviate this last-named objection and at the same time make the oven a permanent part of the stove, which is a desirable feature, by placing the oven beneath the top of the stove and conveying the gas down thereto, thus necessitating two burners, and increasing the expense and putting the oven in a very unhandy and inconvenient position for use.

Another objectionable feature, preventing the more general employment of vapor-stoves, is that there is no protection or shield about the flame, and that the same is therefore subject to drafts from all directions; that the tank containing the fluid is exposed to any large blaze below, which may occur through the overflowing of the generator-pan, and that the walls of the room are soiled by the fumes, &c., arising from the cooking. In experimenting to avoid these objections I found that the oven would bake better or more uniformly and just as quickly if placed at a distance from the burner and the heat conveyed thereto and caused to circulate through the oven and its walls, the flame itself being excluded from direct contact with the oven, while by inclosing both ends, the back and top, of the stove with a suitable hood the burners would be shielded from drafts, the walls from the effects of the fumes, &c., and the tank from any accidental blaze; and with these objects in view my invention consists of the parts and combinations of parts hereinafter described and claimed.

In the accompanying drawings, forming a part of this specification, Figure 1 is a perspective view of my improvement attached to a gasoline-stove; Fig. 2, a vertical longitudinal section through the center of the hood, oven, &c.; and Fig. 3, a detail perspective of the heat-conveyer.

Similar letters refer to similar parts throughout the several views.

A represents the top part of the stove, having the usual openings for the generator-pans; B, the supports therefor, and C the fluid-tank with the pipe $a$ leading therefrom to the generator.

D is a sheet-metal hood consisting of the two end walls, $b$, and the side or back wall, $b'$, and top $c$, the lower edges of said walls being rigidly secured to the edges of the top part, A, of the stove, so as to inclose the space above the same on three sides. This hood may be of any desired sheet metal and of any height, and has an opening, $d$, formed therein, around which a collar, $e$, (indicated by dotted lines,) is secured for the purpose of attaching a stovepipe to conduct off to a flue the fumes arising from the stove, so that the walls of the room will not become soiled thereby. The hood also protects the tank C from any accidental large blaze occurring through the overflowing of the generator-pans.

On the top $c$ of the hood an oven, E, is secured above an opening, $f$, formed in said top. The oven is preferably about two-thirds the length of the hood, so that the remaining part of said top may be used to set dough on to raise, or for warming plates. At a short distance from and parallel with the ends and back of the oven I secure a lining of any suitable sheet metal, $h$, said lining being secured to the bottom of the oven and does not extend quite to the top, but leaves a space, $m$, all around the top thereof, thus forming a hollow wall for the oven. In the outer walls of the oven near their bottoms I form small openings $n$, to open communication with the outer air, and thus cause the heat entering the oven to pass over the top of the lining $h$ and through space $m$ to the openings $n$, creating a circulation of the heat and warming the oven uniformly. I may also place a lining at the top of the oven and connect it with the upper edges of lining $h$, as indicated by dotted lines in Fig. 2, said top lining having a suitable number of openings therein for the passage of the heat.

The oven is provided with the usual grate, $p$, and immediately above the opening $f$ a metal shield, $r$, is secured to dissipate the heat entering the oven.

F represents a heat-conveyer, consisting in this instance of a metal tube of greater diameter at its lower than its upper end, and having a handle, $s$, secured thereto at a suitable point, so that it may be readily removed from or attached to the stove. As clearly shown, this conveyer is placed with its lower end immediately over the burner or generator-pan, on the bars of which it rests, and its upper end projects through the opening $f$ into the oven, so that the heat will be conducted directly into the oven, the latter being at such a distance from the burner that the flame will be excluded. Hot air or gas may also be conducted into the oven through the conveyer.

The advantages of my invention are: The oven is stationary and at such a distance from the flame that it will bake successfully and not burn; it may cover two or more burners and yet, owing to the conveyer, monopolize but one, and then only when in use as a bake-oven; it may be converted into a warming-closet by removing the conveyer; it creates a draft by means of the hollow walls and conveyer, thereby causing more oxygen to enter the burner and increasing the heat; the oven, being elevated, is easy of access; the hood prevents drafts from affecting the fire or blowing the flame into the gas or vapor, protects the tank from accidental blazes, and the walls of the room from the fumes from the stove.

Having thus described my invention, what I claim as new, and desire to secure by Letters Patent, is—

The combination, with a vapor-stove, of the sheet-metal hood or support, the double-walled oven rigidly secured to said hood or support and having openings communicating with the interior of said oven and the outer air, and a removable tubular heat-conveyer covering one of the burners of said stove and opening into said oven, substantially as described.

In testimony whereof I affix my signature in presence of two witnesses.

NORMAN DE FOREST SISCO.

Witnesses:
  G. W. M. WHITE,
  FRED ROBERTI.